United States Patent
Fano et al.

(10) Patent No.: US 8,108,369 B2
(45) Date of Patent: *Jan. 31, 2012

(54) CUSTOMIZED MULTI-MEDIA SERVICES

(75) Inventors: Andrew E. Fano, Lincolnshire, IL (US); Anatole V. Gershman, Chicago, IL (US); Christopher K. Chung, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 327 days.

This patent is subject to a terminal disclaimer.

(21) Appl. No.: 12/563,361

(22) Filed: Sep. 21, 2009

(65) Prior Publication Data

US 2010/0011008 A1   Jan. 14, 2010

Related U.S. Application Data

(63) Continuation of application No. 10/337,609, filed on Jan. 7, 2003, now Pat. No. 7,593,915.

(51) Int. Cl.
*G06F 7/00* (2006.01)
*G06F 17/00* (2006.01)

(52) U.S. Cl. .. 707/696; 707/711; 707/917; 707/E17.009

(58) Field of Classification Search .................. 707/696, 707/711, 917, E17.009; 725/42, 45, 135
See application file for complete search history.

(56) References Cited

U.S. PATENT DOCUMENTS

| | | |
|---|---|---|
| 5,614,940 A | 3/1997 | Cobbley et al. |
| 5,654,886 A | 8/1997 | Zereski et al. |
| 5,805,804 A | 9/1998 | Laursen et al. |
| 5,822,537 A | 10/1998 | Katseff et al. |
| 5,835,667 A | 11/1998 | Wactlar et al. |
| 5,890,152 A | 3/1999 | Rapaport et al. |
| 5,915,256 A | 6/1999 | Rogers et al. |
| 6,005,543 A | 12/1999 | Kimura |
| 6,023,705 A | 2/2000 | Bellinger et al. |
| 6,144,375 A | 11/2000 | Jain et al. |
| 6,157,364 A | 12/2000 | Kohler |
| 6,370,543 B2 | 4/2002 | Hoffert et al. |
| 6,381,640 B1 | 4/2002 | Beck et al. |
| 6,408,301 B1 | 6/2002 | Patton et al. |
| 6,430,582 B1 | 8/2002 | Duncombe |

(Continued)

FOREIGN PATENT DOCUMENTS

EP   0953925   11/1999

(Continued)

OTHER PUBLICATIONS

Yu Chen, Zhaohui Wu and Yunhe Pan—"Intelligent Multimedia Presentation System: An Object-Oriented Approach"—Technology of Object-Oriented Languages, 1997, Tools 24 Proceedings—Sep. 1997 (pp. 304-309:1-6).*

(Continued)

*Primary Examiner* — Jean B Fleurantin
*Assistant Examiner* — Anh Ly
(74) *Attorney, Agent, or Firm* — Vedder Price PC (57) ABSTRACT

Content files such as photographs, video, graphics and/or music are indexed to identify subjects captured in them. Indexed content files are scanned to identify content files that match certain criteria. Content files that satisfy the selection criteria are directed to appropriate output devices for display such that related files are presented in a fashion by which a theme or message is conveyed.

17 Claims, 8 Drawing Sheets

U.S. PATENT DOCUMENTS

| | | | |
|---|---|---|---|
| 6,546,405 | B2 | 4/2003 | Gupta et al. |
| 6,598,229 | B2 | 7/2003 | Smyth et al. |
| 6,643,641 | B1 | 11/2003 | Snyder |
| 6,694,482 | B1* | 2/2004 | Arellano et al. ...... 707/E17.009 |
| 6,740,803 | B2 | 5/2004 | Brinkman et al. |
| 6,741,996 | B1 | 5/2004 | Brechner et al. |
| 6,829,368 | B2 | 12/2004 | Meyer et al. |
| 6,850,257 | B1 | 2/2005 | Colleran et al. |
| 6,919,892 | B1 | 7/2005 | Cheiky et al. |
| 6,990,453 | B2 | 1/2006 | Wang et al. |
| 7,054,508 | B2 | 5/2006 | Hanamoto |
| 7,076,503 | B2 | 7/2006 | Platt et al. |
| 7,131,059 | B2 | 10/2006 | Obrador |
| 7,154,535 | B2 | 12/2006 | Yamasaki et al. |
| 7,167,191 | B2 | 1/2007 | Hull et al. |
| 7,216,295 | B2 | 5/2007 | Wu et al. |
| 7,236,960 | B2 | 6/2007 | Manico et al. |
| 7,240,333 | B2 | 7/2007 | Mainwaring et al. |
| 7,281,199 | B1 | 10/2007 | Nicol et al. |
| 7,287,071 | B2 | 10/2007 | MacLean |
| 7,340,528 | B2 | 3/2008 | Noblecourt et al. |
| 7,432,940 | B2 | 10/2008 | Brook et al. |
| 7,624,337 | B2 | 11/2009 | Sull et al. |
| 7,653,925 | B2 | 1/2010 | Hull et al. |
| 7,660,808 | B2 | 2/2010 | Brechner et al. |
| 2001/0014891 | A1 | 8/2001 | Hoffert et al. |
| 2001/0020954 | A1 | 9/2001 | Hull et al. |
| 2001/0031066 | A1 | 10/2001 | Meyer et al. |
| 2001/0050681 | A1 | 12/2001 | Keys et al. |
| 2002/0007492 | A1 | 1/2002 | Smyth et al. |
| 2002/0019833 | A1 | 2/2002 | Hanamoto |
| 2002/0038363 | A1 | 3/2002 | MacLean |
| 2002/0056082 | A1 | 5/2002 | Hull et al. |
| 2002/0059342 | A1 | 5/2002 | Gupta et al. |
| 2002/0069218 | A1 | 6/2002 | Sull et al. |
| 2002/0083060 | A1 | 6/2002 | Wang et al. |
| 2002/0118949 | A1 | 8/2002 | Jones et al. |
| 2002/0122060 | A1 | 9/2002 | Markel |
| 2002/0166123 | A1 | 11/2002 | Schrader et al. |
| 2003/0009469 | A1 | 1/2003 | Platt et al. |
| 2003/0011683 | A1 | 1/2003 | Yamasaki et al. |
| 2003/0023975 | A1 | 1/2003 | Schrader et al. |
| 2003/0051255 | A1 | 3/2003 | Bulman et al. |
| 2003/0061235 | A1 | 3/2003 | Mainwaring et al. |
| 2003/0135859 | A1 | 7/2003 | Putterman et al. |
| 2003/0146915 | A1 | 8/2003 | Brook et al. |
| 2003/0147465 | A1 | 8/2003 | Wu et al. |
| 2003/0236716 | A1 | 12/2003 | Manico et al. |
| 2004/0001106 | A1* | 1/2004 | Deutscher et al. ............ 345/838 |
| 2004/0015467 | A1 | 1/2004 | Fano |
| 2004/0034869 | A1 | 2/2004 | Wallace et al. |
| 2004/0039934 | A1 | 2/2004 | Land et al. |
| 2004/0040041 | A1 | 2/2004 | Crawford |
| 2004/0060063 | A1 | 3/2004 | Russ et al. |
| 2004/0120010 | A1 | 6/2004 | Back et al. |
| 2004/0128308 | A1 | 7/2004 | Obrador |
| 2004/0215643 | A1 | 10/2004 | Brechner et al. |
| 2005/0015797 | A1 | 1/2005 | Noblecourt et al. |
| 2005/0066219 | A1 | 3/2005 | Hoffman et al. |
| 2007/0053513 | A1 | 3/2007 | Hoffberg |
| 2007/0191070 | A1 | 8/2007 | Rao |

FOREIGN PATENT DOCUMENTS

| | | |
|---|---|---|
| EP | 0959418 A2 | 11/1999 |
| EP | 1403789 | 3/2004 |
| WO | 0215044 A1 | 2/2002 |

OTHER PUBLICATIONS

Tsolis et al.—"Copyright Protection and Management and a Web-based Library for Digital Images of the Hellenic Culture Heritage"—VAST '01 Proceedings of the 2001 Conference on Virtual Reality, Archeology and Culture Heritage (pp. 53-60:1-8).*

Addlesse, Mike et al, Implementing a Sentient Computing System; IEEE; Aug. 2001, pp. 50-56.

Abowd, Gregory D. et al. Cyberguide: A mobile context-aware tour guide; J.C. Baltzer AG, Science Publishers; 1997; pp. 421-433.

Rekimoto, Jun et al; The World through the Computer: Computer Augmented Interaction with Real World Environments; UIST; Nov. 1995; pp. 29-36.

European Patent Office International Search Report for International Application No. PCT/EP03/07764 dated Feb. 5, 2004.

Search Report: European Patent Application No. 04 25 0051: dated Sep. 18 2006.

Vercoustre A-M, "Metadata for Photographs: From Digital Library to Multimedia Application", Research and Advanced Technology for Digital Libraries, Third European Conference, ECDL'99, Proceedings (Lecture Notes in Computer Science vol. 1696) Springer-VRELAG, Berlin, Germany; Aug. 22, 1999.

Butterman D.C. et al; "GRINS: A Graphical Interface for creating and playing SMIL documents"; Computer Networks and ISDN Systems, North Holland Publishing, Amsterdam. Nt. vol. 30, No. 1-7, Apr. 1998.

Fano A, et al. "Personal Media Services: A View of Emerging Media Experiences" Proceedings of the Workshop on Personalization in Future TV, International conference on Adaptive Hypermedia and Adaptive Web-Based Systems, (AH '2002), May 29, 2002, Malaga, Spain.

"Web Search with Metadata Links and multimedia Presentation", G. Ozsoyogly, M.R. Anderson, & Z.M. Ozsoyogly—Sixth International Workshop Multimedia Information, Jun. 16, 2000 (pp. 1-19).

"Information Organization in Multimedia Resources", Rick Kazman & John Kominek—ACM Special Interest Group for Design of Communication, 1993 ACT (pp. 149-162).

* cited by examiner

DATE: 3/28/02
LOCATION: EXPLORATORIUM-SKOKIE
SUBJECT: ARIANNA FANO
PRINCIPALS: REBECCA FANO, ANDY FANO, ARIANNA FANO, ALBERT FANO,
SERVICES        SETTING:        EXPLORATORIUM,
DECORATIONS:    WEILAND PARTY PREP
DINING:         DEERFIELD BAKERY
ENTERTAINMENT:  EXPLORATORIUM

~180

| SCENE | KEYWORDS | SOURCES | MUSIC |
|---|---|---|---|
| ARRIVAL ~182 | TEMPORAL: EARLY EXPLORATORIUM BUILDING, GREETINGS, FOYER, HUGS, FAMILY, FRIENDS | CLIENT, GUESTS EXPIRTORIUM-STOCK-312 WEILAND-STOCK-417 | *LIGHT PIANO JAZZ |
| PLAY ~184 | KIDS, PLAY, FUN, FRIENDS, TOYS, GAMES, CLIMBING, RUNNING | CLIENT, GUESTS EXPIRTORIUM-STOCK-433 ⎫~185 EXPIRTORIUM-CAM-7 EXPIRTORIUM-CAM-8 ⎭ | *CHILDREN'S, LIVELY, FAST |
| BIRTHDAY CAKE ~186 | BIRTHDAY-CAKE, EATING, MESS, DINNING ROOM ~187 | CLIENT, GUESTS DRFLD-BAKERY-STOCK-331 ~188 EXPIRTORIUM-STOCK-471 EXPIRTORIUM-CAM-1 EXPIRTORIUM-CAM-2 | *NONE -CLIENT VIDEO SOURCE- |
| OPEN GIFTS ~190 | TEMPORAL: END GIFTS, PRESENTS, PLAY | CLIENT, GUESTS | *CHILDREN'S SOFT |
| CONCLUSION ~192 | GOODBYE, EXPLORATORIUM BUILDING -SCENE SAMPLING- SIMILAR-EVENT-PAST- | CLIENT, GUESTS EXPLORITORIUM BUILDING EXPIRTORIUM-STOCK-312 | *LIGHT PIANO JAZZ |

CUSTOMIZED MULTI-MEDIA SERVICES

CROSS-REFERENCE TO RELATED APPLICATION

The instant application is a continuation of U.S. patent application Ser. No. 10/337,609, now, U.S. Pat. No. 7,593,915 B2, entitled "CUSTOMIZED MEDIA SERVICES" filed Jan. 7, 2003, the entirety of which is incorporated herein by this reference.

BACKGROUND

Technology and equipment for capturing life's every-day experiences have out-paced the services and mechanisms by which those experiences can be enjoyed at a later date. Digital cameras and portable video cassette recorders now enable consumers to capture more and more information, yet, the volume of the images and video that these devices now capture makes it increasingly more difficult to review any of the experiences they capture. Photographs are often stuffed away. The video tapes that are recorded by camcorders is often tossed aside, seldom, if ever, reviewed.

A problem with the ever-increasing amount of video and photographs that are taken every year is that reviewing them is often very time-consuming and cumbersome. Although video and photographs are captured sequentially over time, they are rarely cataloged or organized in any fashion by which their retrieval is possible, let alone enjoyable.

A method for organizing content embodied as photographs, graphics, video and/or music for presentation would be an improvement over the prior art.

DETAILED DESCRIPTION OF THE PRESENT EMBODIMENTS

Figure 1:
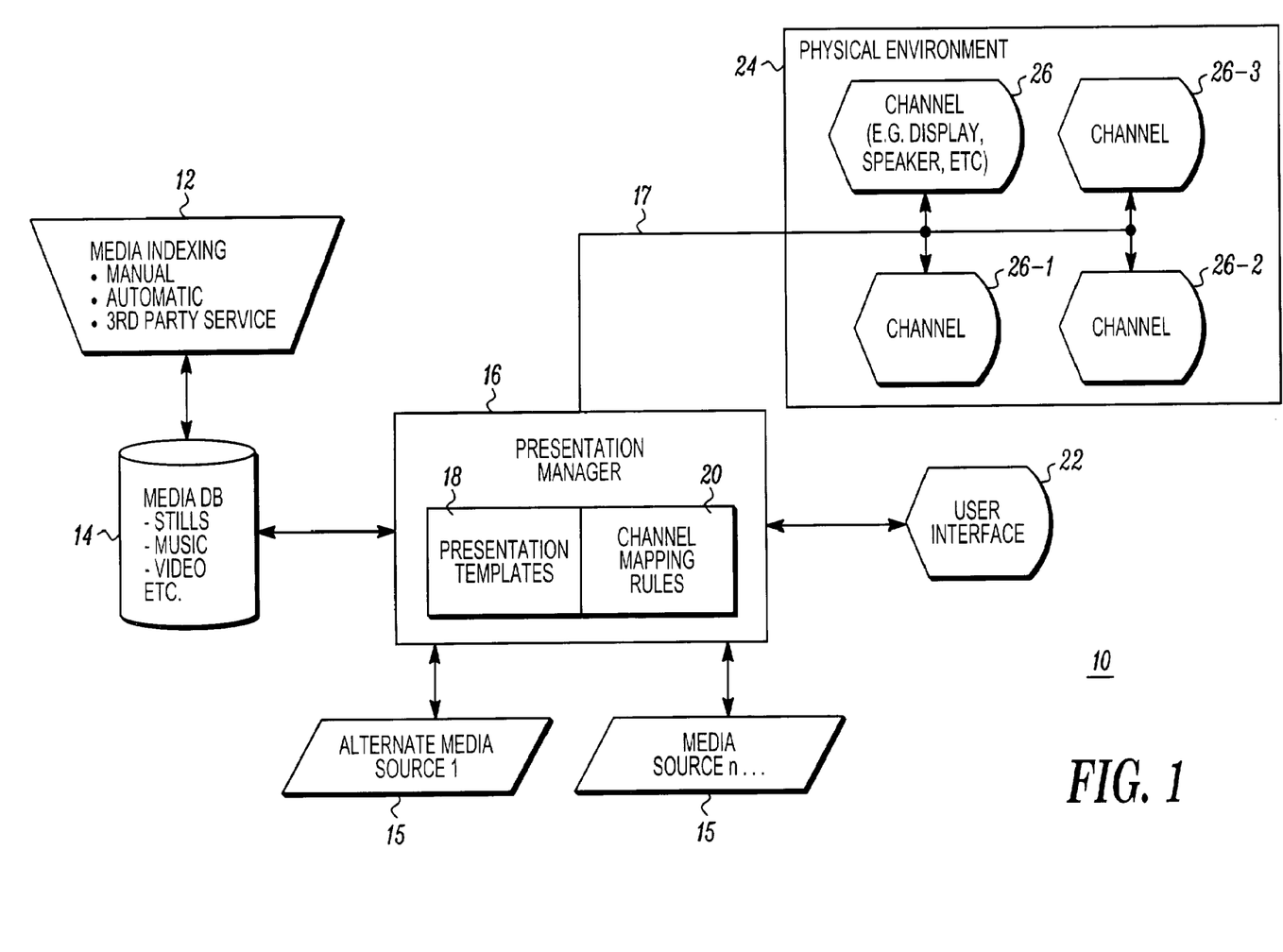
FIG. 1 is a diagram of a system and method for presenting multi-media content for presentation.

FIG. 1 shows the components and functions of one embodiment of a system for organizing content for presentation according to a theme. A media indexer 12 compiles multi-media content, such as photographs, video and audio files, for presentation following a theme. A multi-media content file (or simply "content") presented according to a theme is preferably embodied as photographs, video, audio, graphics and any other type of file in which information is embodied.

A "content file" is any kind of file embodying content. Examples of "content file" include, but are not limited to: a graphic file such as a JPEG file; an MP3 audio file, an MPEG or other video-format file. Content files are preferably embodied in computer data files using an storage appropriate medium and is preferably indexed by information by which a content file can be selected for inclusion into a presentation and consistent with a particular theme.

Content files can be indexed by their being related to or compliant with a subject or a theme. A content file can be considered to be related to or compliant with a theme based on what is in a content file. A content file can also be considered to be related to or compliant with a theme based on what is not in a content file.

Content files can be indexed by the date and/or time at which they were created; who or what is depicted, shown or mentioned in the content. Content files can also be indexed by a background, venue, organization, institution or product depicted in a content file. Additional examples of content index attributes include, but are not limited to, a time or time period to which the content file relates or was captured, a setting or subject depicted in the content file; the individuals or subject matter depicted in or captured by the content file; an event, events, or occasions memorialized in or by the content file, aesthetic and stylistic characteristics of the contents of the file. Each content file that will become part of a presentation, is indexed using any appropriate indicators by which a content file can be identified.

Indexing a content file can be performed manually by a person's inspection or review of the content of a content file, whether the content is embodied in a photograph, computer graphic, an audio file or a video. Manually indexing usually requires that the content file be appended with or identified with a data that identifies the content shown or depicted in the content file. By way of example, a photograph embodied as JPEG file can be associated with, linked to, or edited to include data that identifies the date and/or time that the photograph was taken; who or what is depicted or shown in the photograph; a setting, background or venue depicted in the photograph; a product or service, an event or other occasion shown in the photograph. In an alternate embodiment content file indexing is performed by a computer which scans or sorts through a data structure or list of content identifiers that specify any identifying information about content in a content file can be used to index a content file for use in a thematic presentation.

Those of skill in the art will recognize that both a manual indexing and an automatic indexing can be performed by a third-party service provider. In embodiments where the indexing is performed by a third-party service provider, the service provider can add additional content to a set or collection of content files from which a thematic presentation can be prepared. Alternatively, a commercial indexing service can supply it's own stock content files for inclusion into a thematic presentation, perhaps as advertising of the service provider's goods or services or as advertising for the goods and/or services of other entities that might pay or be paid for the inclusion of their advertising material into a thematic presentation. An example of a third-party-supplied content file would include a photographic or videographic depiction of a hotel supplied by the hotel owner or operator; a photograph or video of a vacation resort that is supplied by the resort owner or operator; airline accommodations depicted in pictures or video that is supplied by an airline, food, or restaurants that are related to the subject matter of the thematic presentation, the thematic content of which is supplied by the purveyor. Alternatively, the third-party supplied content file could include at least portions of at least one previously-broadcast television program or previously-released motion picture that are related to the subject matter of the thematic presentation.

Those of skill in the art will recognize that both a manual indexing and an automatic indexing can be performed by a third-party service provider. In embodiments where the indexing is performed by a third-party service provider, the service provider can add additional content to a set or collection of content files from which a thematic presentation can be prepared. Alternatively, a commercial indexing service can supply it's own stock content files for inclusion into a thematic presentation, perhaps as advertising of the service provider's goods or services or as advertising for the goods and/or services of other entities that might pay or be paid for the inclusion of their advertising material into a thematic presentation. An example of a third-party-supplied content file would include a photographic or videographic depiction of a hotel supplied by the hotel owner or operator; a photograph or video of a vacation resort that is supplied by the resort owner or operator; airline accommodations depicted in pictures or video that is supplied by an airline, food, or restaurants that are related to the subject matter of the thematic presentation, the thematic content of which is supplied by the purveyor.

For purposes of claim construction, the term "thematic presentation" means an organization or selection of multi-media files and their ordered presentation so as to convey or present content in the multi-media files consistently with a theme or message. A thematic presentation is "ordered" by arranging the multi-media files according to some criteria, such as the time and/or date on which a content file was created, subjects depicted or not depicted in a file. A thematic presentation can be "ordered" temporally such that multi-media files are selected and arranged on the basis of an event, location, product or service that is depicted or not depicted in the multi-media content files. A thematic presentation can be "ordered" by arranging thematically related content files randomly.

A "theme" should be considered to be any sort of message or idea that is conveyed by, depicted in or associated with the content files. A "thematic presentation" is a presentation of multi-media according to, or consistent with, a theme, which is identified according to the contents of a template file. A multi-media "presentation" is thematic if at least some of the multi-media content pertains to or relates to an idea, subject, event, person or persons, a time or era, a product, a service or any other topic or idea. Examples of a thematic presentation would include, but are not limited to, a series of photographs taken during a wedding, a vacation, a graduation ceremony, a conference, a business meeting, a subset of which are subsequently organized in some manner so as to convey the experience to others, perhaps without having to view all of the photographs that might have been taken. A thematic presentation can also include one or more audio files that might include music, narration, or both.

In FIG. 1, a system and method for presenting multi-media in a thematic presentation is shown. The depiction in FIG. 1 is also considered to be a method because much of the functionality of the invention disclosed and claimed herein is by way of software. As such, FIG. 1 depicts functions of software.

A multi-media database 14 includes electronic files that contain information embodied in media such as still photographs, graphic files, music, or video. The information in the files stored in the data base 14, can be stored on a mass storage device such as a disk drive, tape, DVD or the like, indexed and retrieved at a later time. The media database 14 preferably includes for each stored file, indexing information by which certain data or information recorded in each content file can be identified and selectively retrieved from the media database 14 by an appropriate database search engine or an individual.

In FIG. 1, content files for inclusion into a thematic presentation can also be obtained from alternate sources multimedia sources 15. Examples of alternate multi-media sources include but are not limited to pictures or graphics available on line such as newspapers, periodicals and the like; multi-media provided by third parties, such as stock footage from a vacation or meeting site for inclusion into a thematic presentation, assuming of course that the multi-media available from such sources 15 is indexed such that the indexes can be scanned or tested for conformance to the presentation template.

The presentation manager 16 is preferably embodied as a computer program running on a computer, which has access to or is coupled to one or more of the aforementioned databases 14 and 15. The presentation manager 16 scans, sorts or tests the content file indexes, testing the indexes against specifications of content files to include in a thematic presentation, which are in a presentation template 18 and using mapping rules 20 to identify records from the media database 14 or from the alternate multi-media sources 15 as appropriate for inclusion into a thematic presentation. Content files in the media database 14 or from the alternate multi-media sources 15 are identified by the presentation manager's scanning or searching indexes in the database 14 and/or multi-media sources 15 and identifying indexes that identify content files that conform to a specification or template for a thematic presentation. The presentation template 18 and the mapping rules 20 determine what sort of content goes into a thematic presentation as well as the identity of the content files stored in the database 14 and therefore determine the theme or message of a thematic presentation by specifying content files and therefore content to include. Stated alternatively, the presentation manager uses a thematic template as a sort of database selection criteria, although the thematic template can include multiple selection criteria.

In a preferred embodiment, a presentation template 18 is a multi-element data structure, the components of which identify content to include in a presentation. Multi-media files in a database 14 or 15 that contain content that is consistent with the presentation template 18 specifications are selected by the presentation manger 16 or other sorting program to be merged or included as part of a presentation. When a content file is selected from a database, it is displayed on one or more display devices via one or more display channels according to specifications in the presentation template 18. By way of example, pictures, movies, or sound tracks that were recorded during a certain time period and which depict a child can be displayed on one screen while pictures, movies or sound tracks that were recorded during the same time period but which depict other family members or friends can be displayed on another screen so as to create a presentation where a subject is displayed on one device while a related subject is displayed on a different screen. The presentation of two related subjects during the same time period on two different screens can be considered a thematic presentation.

In a preferred embodiment, a presentation template 18 is a multi-element data structure. the components of which identify content to include in a presentation. Multi-media files in a database 14 or 15 that contain content that is consistent with the presentation template 18 specifications are selected by the presentation manager 16 or other sorting program to be merged or included as part of a presentation. When a content file is selected from a database, it is displayed on one or more display devices via one or more display channels according to specifications in the presentation template 18. By way of example, pictures, movies, or sound tracks that were recorded during a certain time period and which depict a child can be displayed on one screen while pictures, movies or sound tracks that were recorded during the same time period but which depict other family members or friends can be displayed on another screen so as to create a presentation where a subject is displayed on one device while a related subject is displayed on a different screen. The presentation of two related subjects during the same time period on two different screens can be considered a thematic presentation.

Content files are selected from a media database 14 or from alternate media sources 15 in order to make a multi-media presentation that is consistent with, or which delivers a multi-media experience that is consistent with a particular theme. An example of a presentation template 18 is disclosed in FIG. 6 and identified therein by reference numeral 180.

Figure 6:
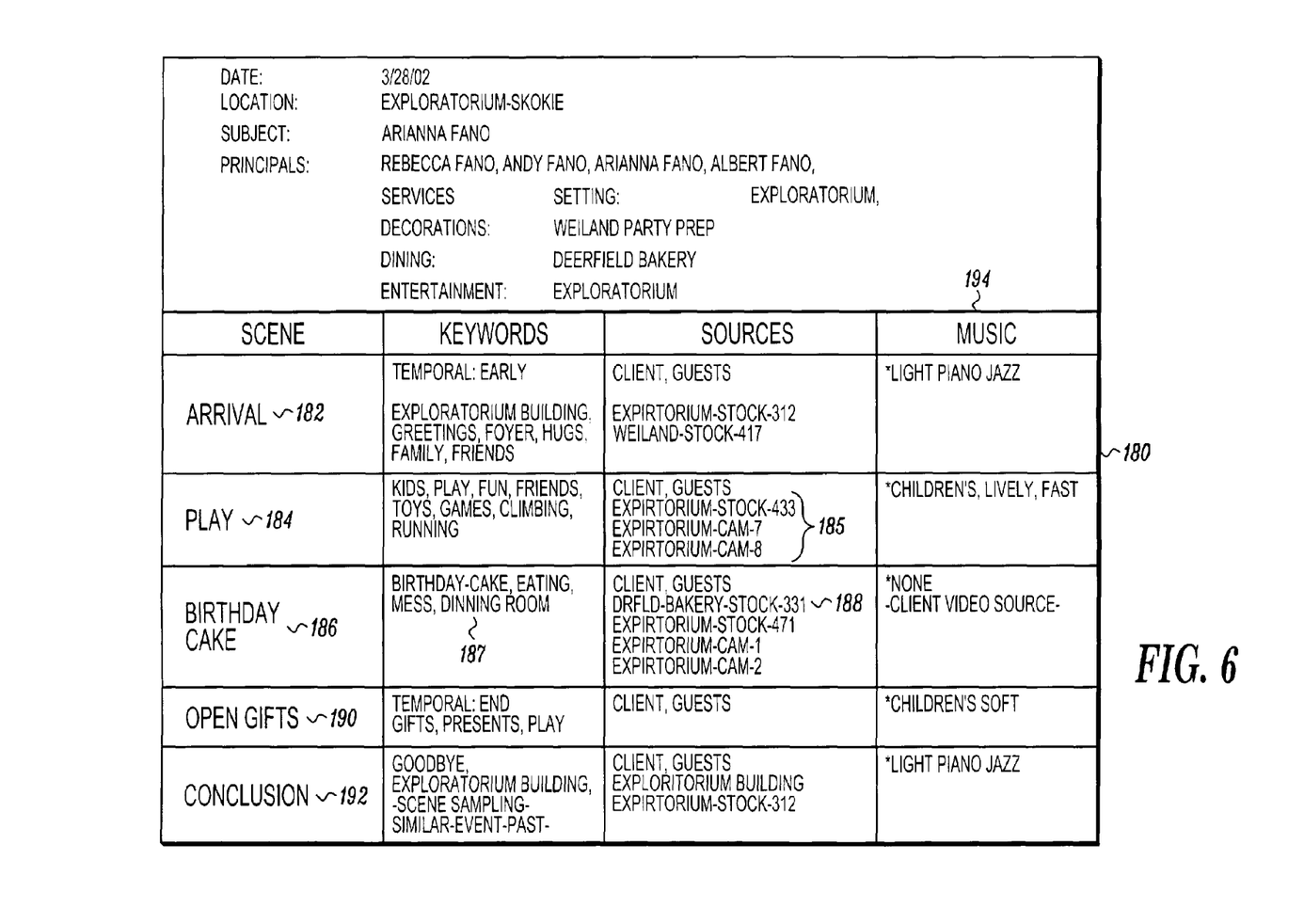
FIG. 6 shows a template for organizing content for presentation.

In FIG. 6, the presentation template 180 (also referred to as a "thematic presentation template") specifies the content to be included in a presentation of a child's birthday party. The thematic presentation template 180 is used as a guideline or specification to select and organize content files such as photographs, graphics, audio and video into a combined or merged presentation of all of the individual content files that satisfy the criteria specified in the presentation template 180. The presentation template 180 is analogous to a database selection criteria, although multiple criteria can be employed to select multi-media for inclusion. In at least one embodiment, a multi-media file that satisfies a single criteria can be selected for inclusion, however, other embodiments can require selected multi-media content files to be selected only if they meet two or more selection criteria specified in the presentation template 180. When the content files are selected, they can be read from the database 14 and/or 15 and presented on one or more output devices as a merged presentation.

In FIG. 6, the thematic presentation specified by the presentation template 180 is designed to have content files depict an arrival segment 182, a play segment 184, a "birthday cake" segment 186, a segment depicting the opening of gifts 190 and a conclusion segment 192. With respect to the arrival segment 182, content files are selected or read from a database 14 and/or 15 by any appropriate index that identifies a content file as depicting events that occurred early in the day on which the birthday party was celebrated. The presentation manager 16 depicted in FIG. 1 sorts through the multi-media records in the database 14, examining the indexing of each multi-media file to identify multi-media content files such as still photographs, music, and/or video taken early in the day. Selected content files might have or include or depict the location of the birthday party (e.g., the Exploratorium Building), greetings between guests such as the perfunctory handshakes or embraces between family members and friends as they arrive at a party. The content files for use in the arrival segment 182 might also be identified according to the guest or client depicted in the content files as indicated by the index information associated with the content files that are selected.

The presentation template 180 can also specify output channels to which files should be sent for display. In addition, the presentation template 180 can specify that pictures or videos that depict the arrival segment 182 should have a background or foreground music accompaniment. A light piano jazz for example, can be blended with a timed and sequenced display of photographs.

In at least one embodiment, the presentation template 180 can be modified by a user, using an editor for example, such that the content files that are selected by the presentation manager can be modified in real-time. By editing the presentation template interactively, the thematic presentation can be modified interactively as well.

In a thematic presentation, content files such as photographs, are typically concatenated either by time of capture, subjects shown or other criteria, such that they can be shown in sequence, one after the other. The presentation order of files, pictures or video requires an appropriate playback mechanism (i.e., broadcast channel) as would the presentation of music files require audio equipment by which a music file could be reproduced.

In FIG. 1, channel mapping rules 20 are used by the presentation manager to select and organize content files in order to establish a particular presentation effect. An example of a channel mapping rule 20 is the sequencing of the arrival segment 182 with respect to the play segment 184 and the "birthday cake" segment 186 in that depictions or representations of the bulk of the play segment should come after the demonstration of the arrival segment. Stated alternatively, a thematic presentation of a child's birthday party is often best appreciated when the actual party during which the birthday cake is enjoyed and gifts are opened, is presented after the viewer of the thematic presentation witnesses the arrival of certain guests and events leading up to the birthday cake and gift opening such as children's play beforehand.

Channel mapping rules can also specify how multi-media files are to be played back or presented. For instance, a thematic presentation of a child's birthday party might require that pictures of the guest of honor be shown on one screen while pictures of party attendees be shown on other screens, with or without music accompaniment.

The presentation template 180 of FIG. 6 includes a play time segment 184. Content files selected for this play segment can be selected based upon key words in the content file indexes that indicate that the subject matter depicted in a particular content file is associated with children playing during the birthday party and after the guests started arriving.

In at least one embodiment of the invention disclosed and claimed herein, a thematic presentation can be prepared by a third party. In such an embodiment, the content files selected for presentation can be blended with or merged into a thematic presentation along with stock footage or photographs of the third party service provider. Examples of such a presentation would include photographs and/or video of the organization or venue whereat a party was had. The inclusion of commercial subject matter or advertising into a thematic presentation can enable a commercial entity to effectively advertise its goods or services in context and setting whereby the commercial message can controlled and effectively presented.

In FIG. 6, stock photographs, videos, or graphics 185 might be added to or included with or merged into the other content files and become part of a thematic presentation.

Segment 186 of the presentation template 180 is constructed from content files that depict or show the birthday cake 187. The birthday cake segment 186 of a thematic presentation can include the depiction of certain individuals or guests 188 as well as stock graphics, pictures or video of the bakery or other entity that prepared or created or perhaps delivered the birthday cake, depicted in other content files of the birthday cake segment 186.

In segment 190, content files can be selected from the media database according to events depicted in those content files that are related to the opening of birthday gifts by the party celebrant. Except for the bulk, content files from the database 14 might also be selected by guests or other individuals or subjects depicted in the content files created.

In segment 192, the conclusion of the birthday party is presented in a thematic presentation by selecting content files that depict guests leaving or saying their good-byes. Stock footage of the venue where the party was held might be included showing some favorable aspect or characteristic of the venue for commercial purposes.

Throughout the thematic presentation 180, pictures, graphics and/or video can be accompanied by the aforementioned music 194, the files of which can be selected according to criteria pertinent to each segment of the thematic presentation.

By using the specifications in the presentation template 16, the presentation manager 16 can select files from a database 14 or 15, read the appropriate files from the database 14 or 15 and direct the files to a physical environment for display or playback. The output of the presentation manager 16 can therefore be considered to be the file or files that are to be viewed or played on an appropriate device in a physical environment 24.

In FIG. 1, output of the presentation manager 16 is provided to a physical environment 24 in which a thematic presentation is presented. For purposes of claim construction, the physical environment 24 includes the medium in which the thematic presentation is published for consumption by an observer. "Publishing" means playing, viewing, listening to, storing, or sending the multi-media files that make up a thematic presentation. Publishing a thematic presentation occurs by any mechanism by which the content of the content files are displayed or played back. Examples of publishing a presentation can be via a video display device such as a television receiver or computer monitor; broadcasting audio files in the presentation; displaying all or part of a thematic presentation on multiple monitor or televisions, with or without an audio channel. Publishing can also occur by storing the thematic presentation (which is really a collection of multi-media files) as well as transmitting the thematic presentation to a third party, such as by way of an e-mail message or web download.

In FIG. 1, the physical environment 24 in which a thematic presentation can be published includes one or more channels 26 such as one or more video displays (a television, for instance). In at least one embodiment, multiple display devices such as several television receivers or several computer monitors can be used to share the experience of a multimedia thematic presentation. Other channels would include the aforementioned electronic transfer or playback of video or audio files as well.

The channel(s) 26 on which different components of a thematic presentation are played are specified in a presentation template 18. By way of example, the presentation template 18 can specify that pictures or video related to a certain person or topic be played out of a particular channel 26-1 while pictures or video related to the person or topic played out of channel 26-1 are instead displayed out of channel 26-2 and/or 26-3.

A user interface 22 in one embodiment as provided by a keyboard, monitor or mouse by which content files can be selected for inclusion into a presentation, the presentation can be retrieved and stored and played, or a presentation can be terminated. Examples of a user interface 22 include a keyboard, mouse, voice-recognition control. The user interface 22 can enable a user, which is any person publishing a thematic presentation, to interact with the thematic presentation, including interactively modifying the thematic template so as to alter the selection criteria of content files.

By altering content file selection criteria in a template, it is possible to create a multi-media thematic presentation of a theme, albeit of a different time period, different subject matter or any other different topic about which a thematic presentation can be made. By altering template specifications in real time, a thematic presentation can be modified interactively such that content that is published can be changed interactively in real time.

Figure 2:
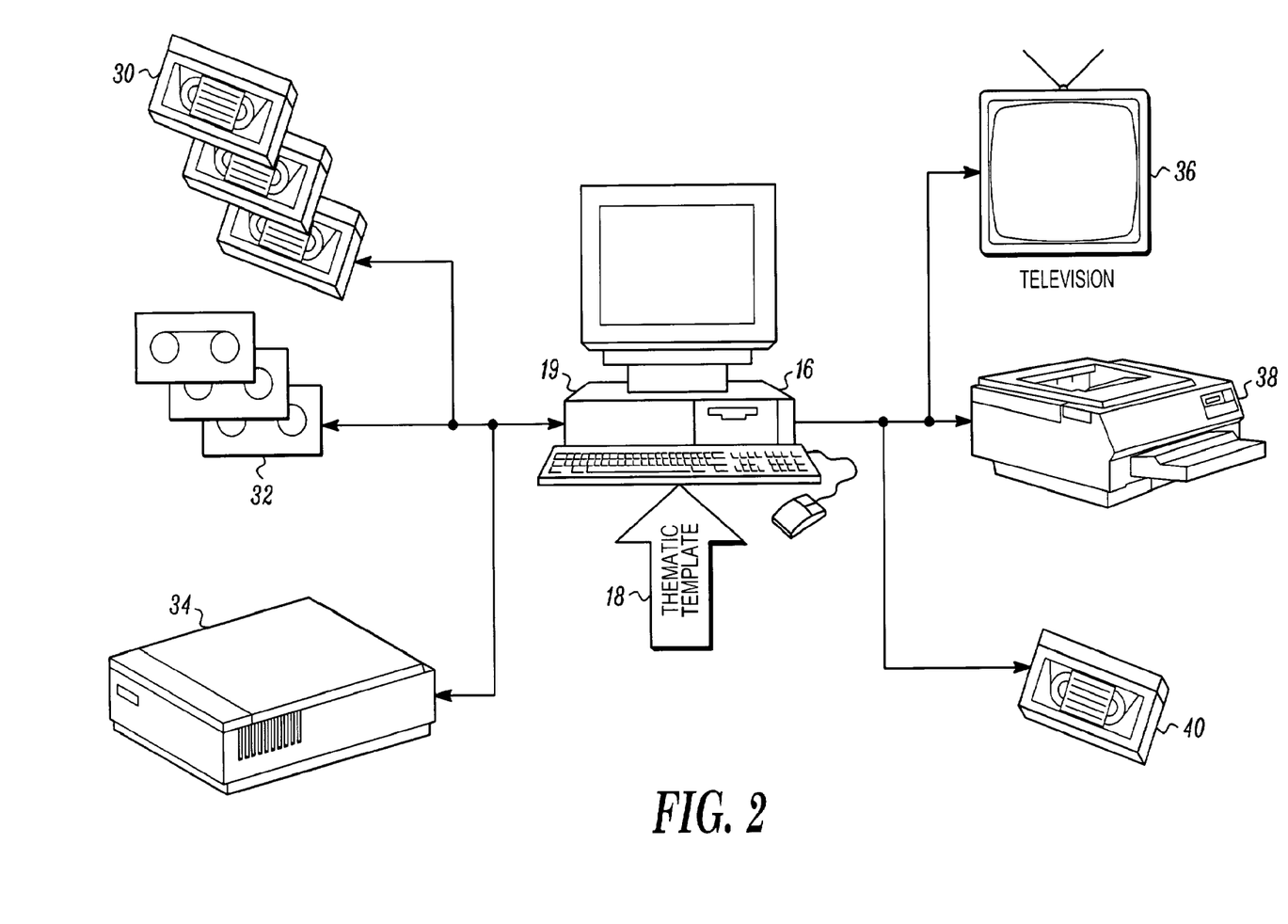
FIG. 2 depicts a system for presenting a thematic presentation.

FIG. 2 depicts a system for organizing multi-media content files for a thematic presentation. In FIG. 2, the presentation manager 16 is also embodied as software running on a personal computer 19. The presentation manager 16 performs a function analogous to a database manager in that it selects records from disc storage, or from external sources such as video tape 30, audio tape 32 or graphics 34. When presentation-template-compliant content is located, the presentation manager 16 causes the computer 19 to output the content to a channel to which a playback device can be coupled. In FIG. 2, the output channels include a television 36, a printer 38 and a storage device 40 (depicted only as a video tape cassette).

As set forth above, a presentation template 18 is embodied as one or more data files or one or more data structures, the contents and organization of which specifies content files to include in a thematic presentation and the channels or playback devices and environments in which to play back a thematic presentation.

The computer 19 will of course be provided with software by which the content files can be formatted and delivered to the output devices on which the content files are to be displayed. As shown in FIG. 1, the content files output from the computer 19 are delivered to the output devices 36, 38, 40 et al. over "channels" which can be embodied as serial or parallel communications ports such as a USB port, an RS-232 serial port and others. Such software and communications ports is known to those of ordinary skill in the art.

When acting under the control of the presentation manager 16, the computer 19 will receive the thematic template information 18, such as that depicted in FIG. 6, in embodiment of a data file or data structure by which certain files of the sources 30, 32, and 34 can be automatically selected. The computer 19 will include software which scans records in the database of files and, upon detecting files that have criteria that match the thematic template 18, the computer 19 will assemble the content files by copying them into another file or data structure which can be played back through an appropriate output device such as the television 36, a printer 38 or perhaps a plasma display (not shown). Still another embodiment whereby the thematic presentation can be broadcast would include transmitting the output file of content files via a data network to a remote location, such as by way of an e-mail attachment, the technology of which is well-known in the art.

Figure 3:
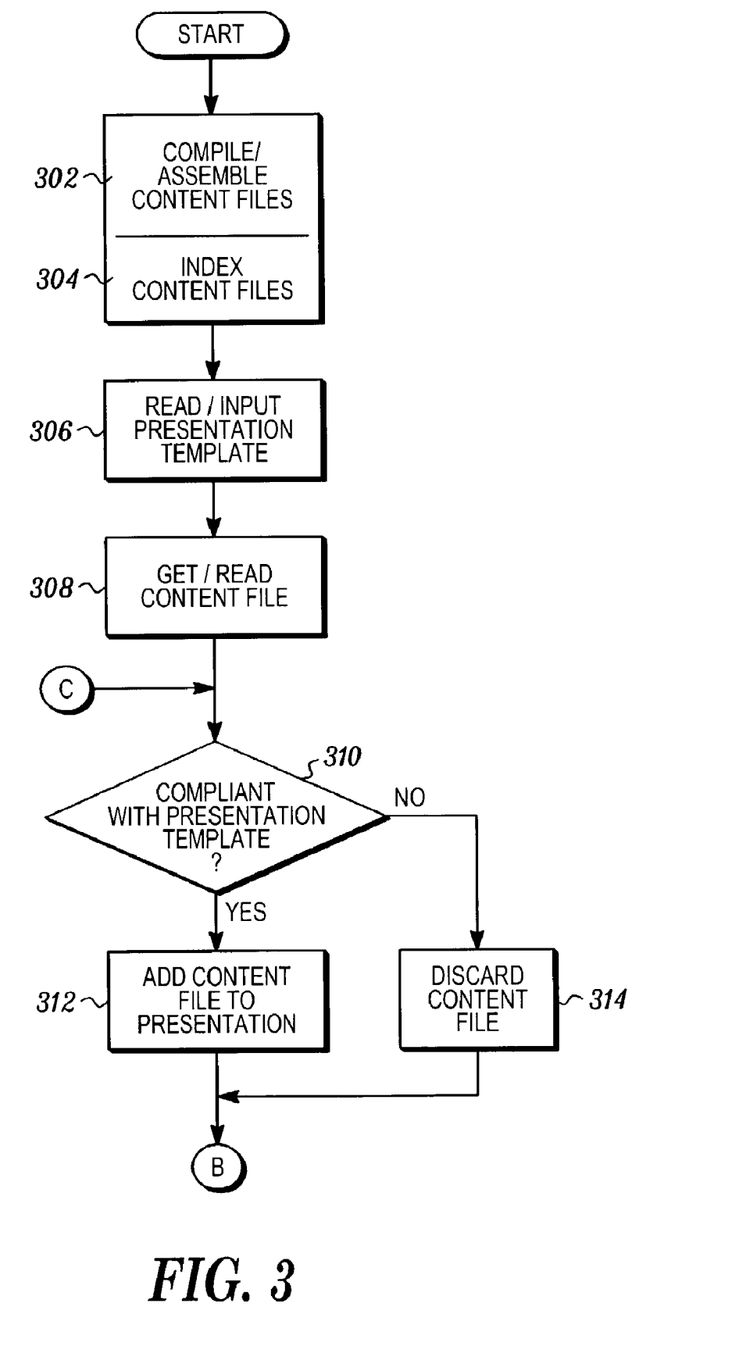
FIG. 3 shows steps of a method of organizing content for presentation.

FIG. 3 depicts the steps of a method for organizing multi-media content files for thematic presentation. At step 302, content files are compiled for potential use in a thematic presentation. Once the content files that might be used in a presentation are identified, each of them will often require indexing as shown in step 304 if they were not already indexed, such as by a date/time stamp among other things. Indexing a content file can be done manually such as by marking a photograph or a videotape or an audio file as being pertinent to a particular event, time of occurrence, individual, or subject. For instances where content files are created electronically, such as by a digital camera, content files can be indexed by the date and time at which they were created. They can also be indexed by associating with them a data file or data structure specifying the subject matter, event, persons or venues represented or captured by the file.

At step 306, the presentation template is considered or input, which is important because the presentation template specifies characteristics or attributes of content to be included in a presentation as well as the order in which they are presented and any special effects, music or media in which the completed presentation is to be displayed.

At step 308, a first content file index is considered. Content file indexes can be stored in the database 14 such that a computer or other processor can scan the index to identify content files with certain attributes, which would be indicated in the content file's index.

At step 310, a decision is made whether or not the content file read in step 308 is consistent or compliant with the presentation template that was read in step 306. The decision of step 310 is made using information in a content file index.

In step 312, if the content file is consistent with or compliant with the template (as indicated by data in the content file's index) the content file is marked or flagged such that the content file will be designated as part of the thematic presentation in step 312. If it is determined at step 310 that a content file is determined to not be compliant or consistent with the presentation template, the content file is ignored or discarded at step 314.

Figure 4:
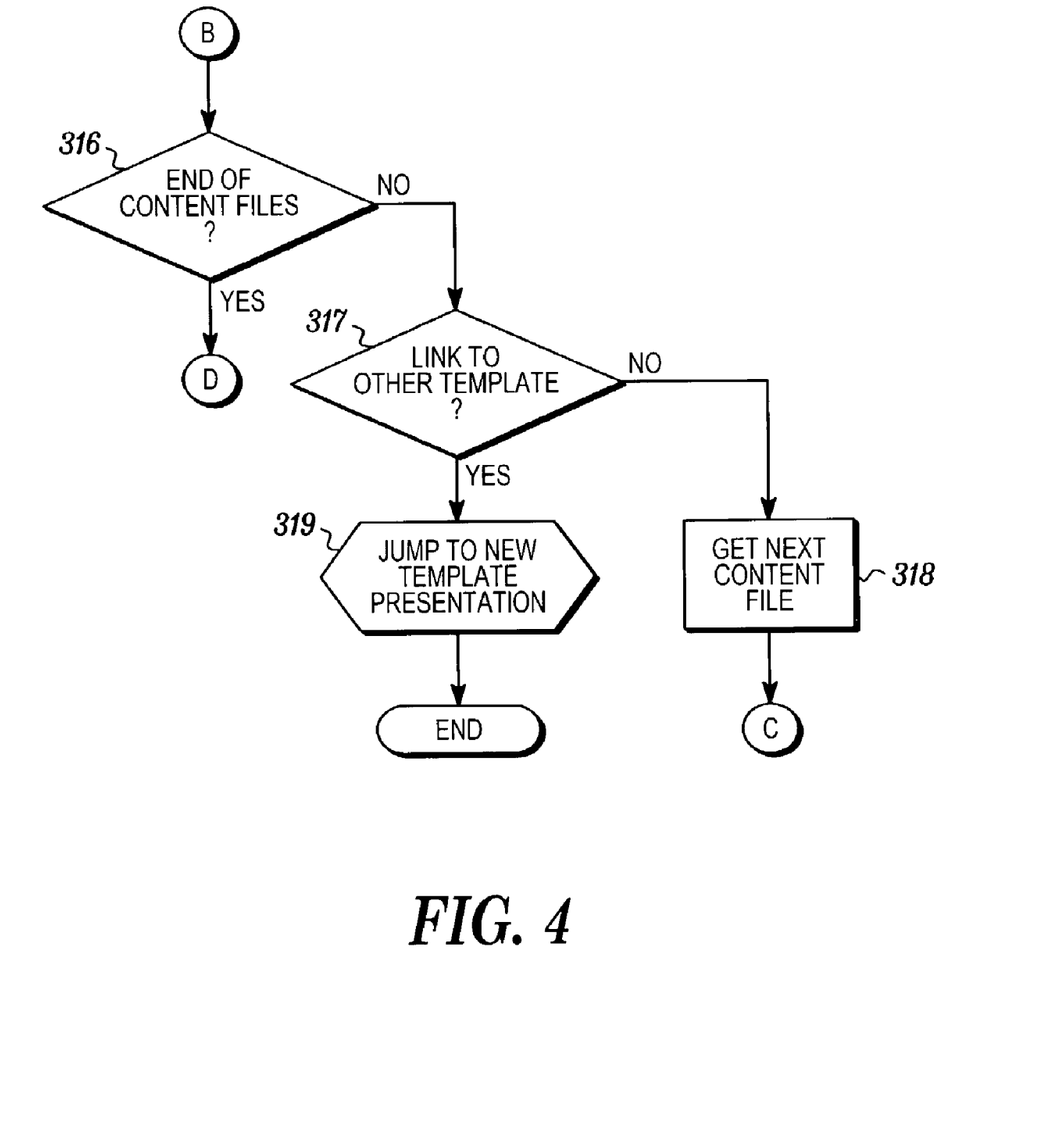
FIG. 4 shows a continuation of the chart shown in FIG. 3.

The process of organizing multi-media content files for a presentation continues in FIG. 4. A test is performed in step 316 as to whether all of the content file indexes have been considered or read. If it is determined in step 316 that other content file indexes remain to be considered for inclusion of the corresponding content files in the presentation, program control proceeds to step 318 for the next content file is retrieved. The program control leads back to step 310 for the next-selected content file is tested for its compliance with the presentation template.

In step 320, the medium (audio, video, multi-screen, etc.) in which the presentation will be presented is selected from the template 180. A medium in which a presentation can be played back can include a video or graphic display device such as a television receiver on which pictures or photographs can be sequentially displayed one at a time with each photograph being held in position on the television screen for a pre-determined time. An audio file might be played in the background such that photographs are presented sequentially, maintained on screen for some time duration accompanied by some appropriate thematic music.

In step 320, the medium (audio, video, multi-screen, etc.) in which the presentation will be presented is selected from the template 180. A medium in which a presentation can be played back can include a video or graphic display device such as a television receiver on which pictures or photographs can be sequentially displayed one at a time with each photograph being held in position on the television screed for a pre-determined time. An audio file might be played in the background such that photographs are presented sequentially, maintained on screen for some time duration accompanied by some appropriate thematic music.

In step 322, the content files for use on the selected medium are formatted. By way of example, photographs for presentation on a television receiver will need to be converted into video signals so that the television receiver can reproduce the still frame images using video signals. Alternatively, the photographs might be formatted as print files for printing from a printer 38. Similarly, video files from which a thematic presentation might be made, might be concatenated (linked together in a stream) and stored on a magnetic tape 40 for playback on a device such as a VCR.

At step 324, the presentation and the content that it is comprised of can be published. The term "published" should be construed to mean distribution or playback of the presentation including each of the files that was selected and combined or merged so as to create the thematic presentation.

Figure 5:
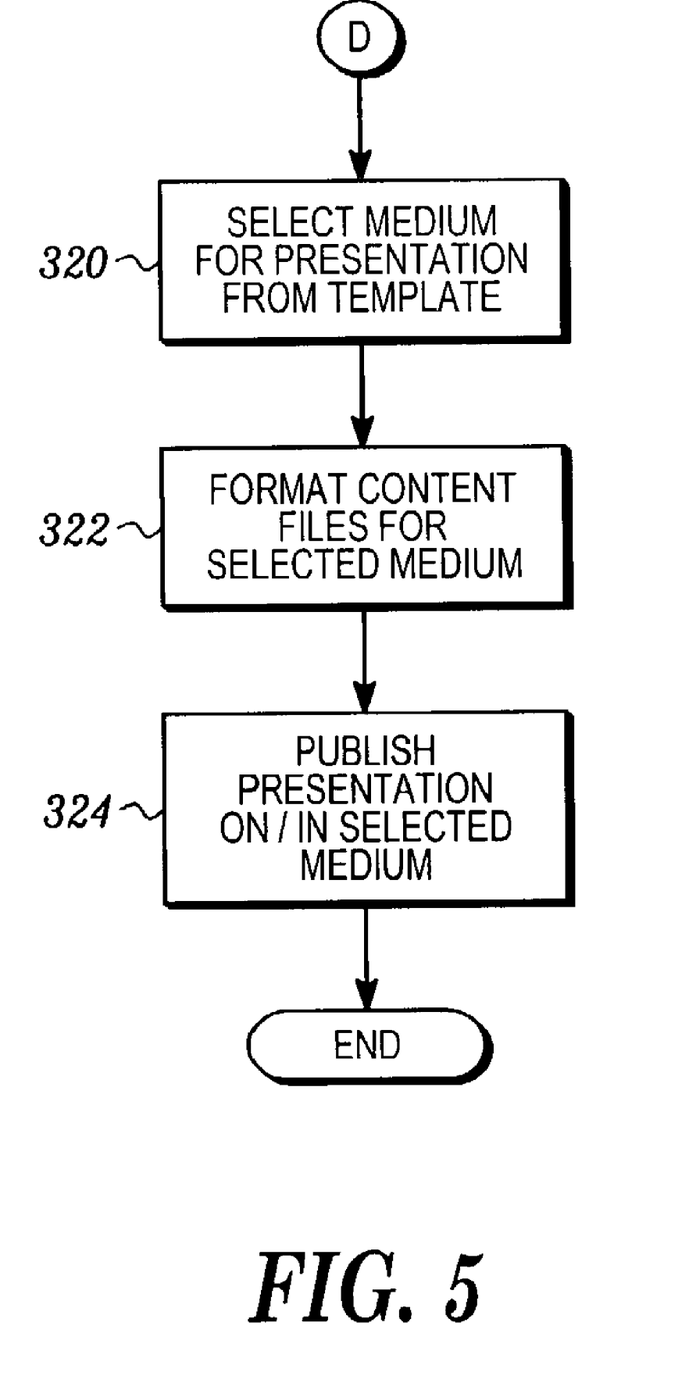
FIG. 5 shows a continuation of the chart shown in FIG. 3 and FIG. 4.

At step 317, a decision can be made to link another presentation. Linking a presentation can be accomplished by including the optional inclusion into the first template 18. By organizing and presenting a first set of content files according to a first thematic template and including in the first thematic template a link to another thematic template, it is possible to view one or more content files and if desired, view a different set of files that are only referenced in or related by the first thematic template. At step 319, the new thematic presentation is viewed using steps depicted in FIGS. 3, 4 and 5.

Figure 7:
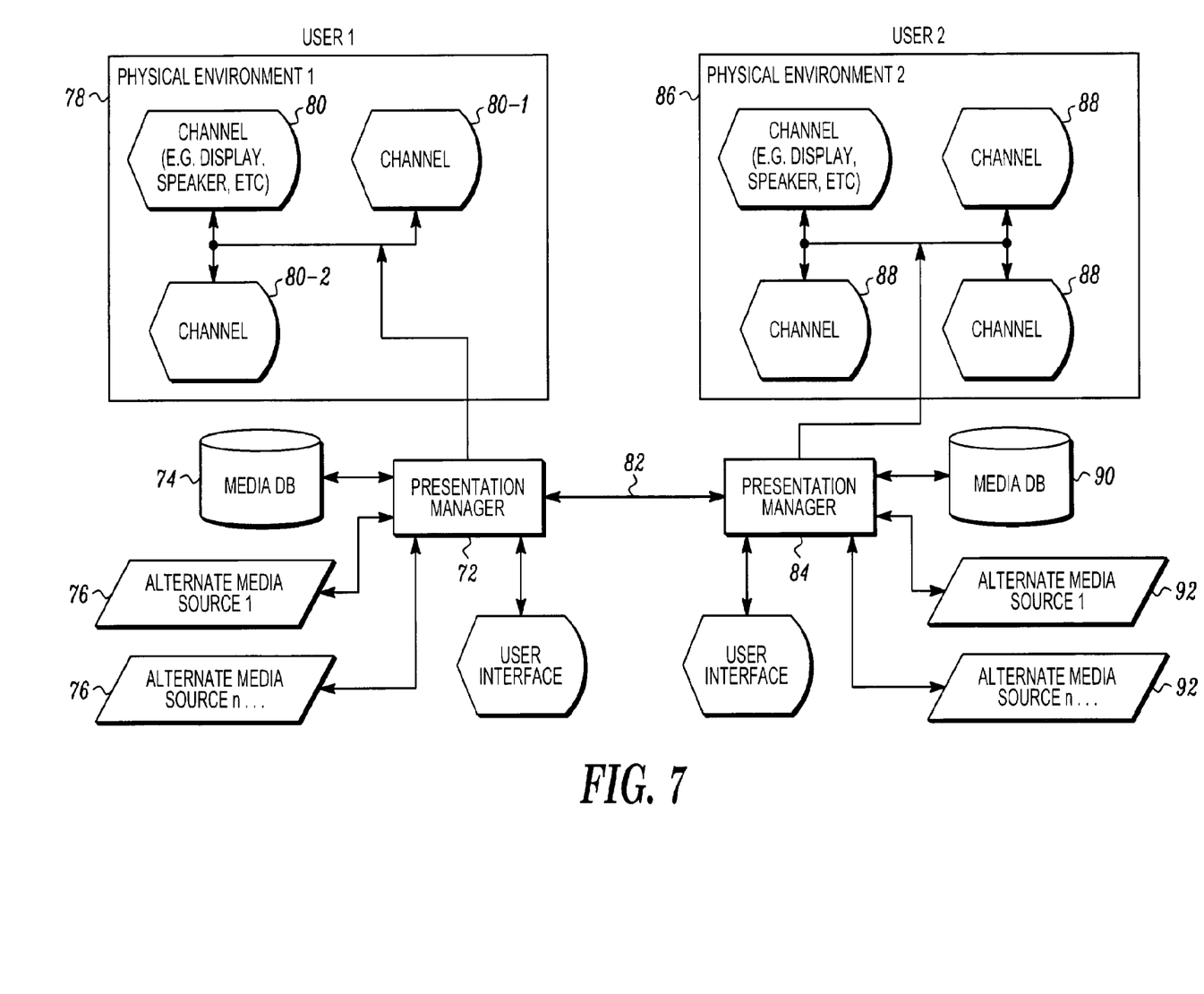
FIG. 7 shows an alternate embodiment of a system for presenting multi-media.

FIG. 7 shows an alternate embodiment of a system and method 70 for organizing and presenting multi-media files as a thematic presentation that can be viewed interactively with other people, possibly at other locations. The embodiment of FIG. 7 provides for "social interaction" between two users viewing a thematic presentation at possibly different locations.

In FIG. 7, a first presentation manager 72 "reads" a first presentation template 18 (shown in FIG. 1 and FIG. 6, but not shown in FIG. 7 for clarity) that is accessed or part of the computer on which the first presentation manager 72 runs. The first presentation template and rules are not shown in FIG. 7 for clarity.

Specifications in the presentation template 18 are used by the first presentation manger 72 to select certain files stored in a database 74 or available from alternate media sources 76 such as on-line databases. The files selected from the databases 74 and 76 (i.e., the selected "content files) conform to specifications in the first presentation template 18.

After content files are selected or identified, they are copied or output by the first presentation manager or other appropriate controller to a first physical environment 78 where the selected files can be viewed or listened to by way of appropriate play-back devices that comprise a channel 80 in the physical environment. By way of example, if the first presentation template 18 specifies the presentation of a photograph of a certain individual at a certain time period and/or at a certain location, upon finding such a photograph in the database 14 or 15, (as determined by information in the indexes) the first presentation managers will copy the selected file and cause the file to be output to a channel in the physical environment where the photograph can be viewed. In FIG. 7 for instance, photographs of a child, at a particular time period or at a particular location, could be directed by the presentation manager 72 to be displayed on channel 80-1 in the first environment 78. The channel 80-1 could be directed to a large, wall-mounted plasma display on which the child's photograph would be made to appear. In addition, the presentation manager could direct a photograph of the child at a different time period but at the same location to be displayed on channel 80-2, which could be directed to a television or computer monitor or a second, wall-mounted plasma display. As such, the child's picture at the same location but at two different times would be displayed on two different monitors.

In the embodiment shown in FIG. 7, the first presentation manager 72 can be operatively coupled 82 to a second presentation manager 84 such that content files selected from the databases 74 and 76 can be delivered from the first presentation manager 72 to a second presentation manager 84. Files delivered to the second presentation manager 84 can be presented to a second physical environment 86 for display/playback on devices in the second physical environment 86 using corresponding channels 88.

In addition to receiving the multi-media files of a first thematic presentation prepared by the first presentation manager 72, the second presentation manager 84 can access a media database 90 as well as alternate databases 92 and obtain additional content files from those other databases. When the second presentation manager 84 is provided with it's own presentation template, i.e., a second presentation template 18, the second presentation manager 84 can prepare a second thematic presentation from content stored in the databases 90 and 92 that comply with the second presentation template 18. In so doing, the second presentation manager 84 can publish the second thematic presentation to the second physical environment 86 as described above, or publish the second thematic presentation in the first physical environment 78 via the first presentation manager 72. In either case, a thematic presentation can be published (presented) to two or more people substantially simultaneously and provide for both, a social interaction with each other through the multi-media presentation.

Figure 8:
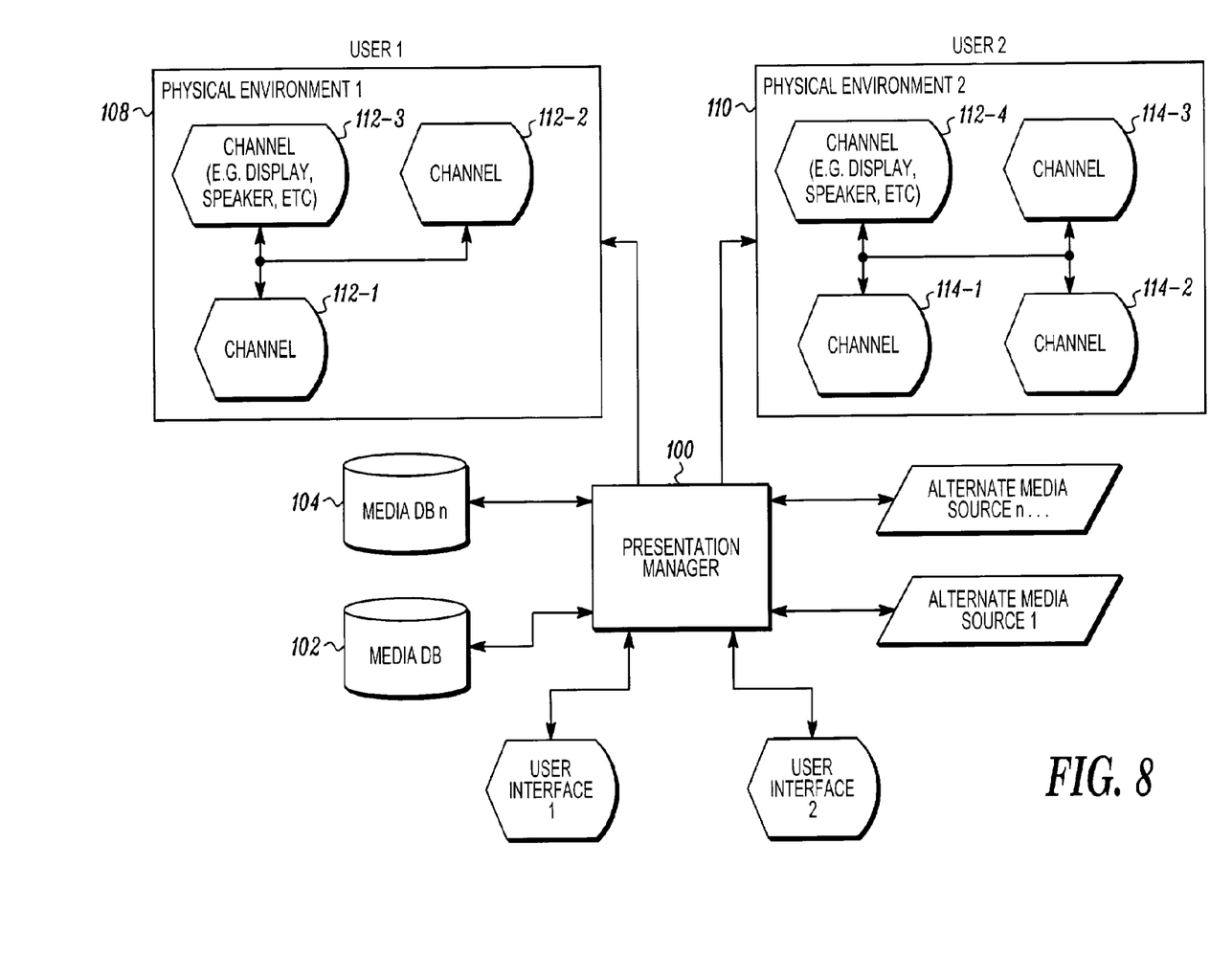
FIG. 8 shows an alternate embodiment of a system for presenting multi-media.

In addition to the systems and methods shown in FIGS. 1, 2 and 7, all of which provide customized multi-media service, FIG. 8 shows another embodiment of a system and method for providing a custom multi-media service. The system and method depicted in FIG. 8 also enable social interaction between two or more people at two or more different locations.

In FIG. 8, a single presentation manager 100 has access to first and second multi-media databases 102 and 104 and from which indexed multi-media content files can be obtained, if they comply with a presentation template 18 and rules used by the presentation manager 100. In addition to multi-media files in the two multi-media databases 102 and 104, the presentation manager 100 can obtain content for inclusion into a thematic presentation from alternate media sources 106.

Using files (and content therein) from the databases 102, 104 and 106, the presentation manager 100 can send the thematic presentation to either one or both of two (or more) physical environments 108 and 110 for publication. In the first physical environment 108, the thematic presentation is displayed or played back on devices that are coupled to three different channels 112-1-112-3. In the second physical environment, the thematic presentation is played back on four different channels 114-1-114-4. In both environments 108 and 110, the channels on which a thematic presentation are played should be specified in the presentation template.

In the embodiments shown in FIGS. 7 and 8, a user interface is provided by a keyboard, monitor or mouse. The user interface enables commands to be entered to the presentation managers by which a presentation template can be altered so as to select different content files from the associated databases for inclusion into a presentation. The user interface 22 can enable a user, which is any person publishing a thematic presentation, to interact with the thematic presentation, including interactively modifying the thematic template so as to alter the selection criteria of content files.

By altering content file selection criteria in a template, it is possible to create a multi-media thematic presentation of a theme, albeit of a different time period, different subject matter or any other different topic about which a thematic presentation can be made. By altering template specifications in real time, a thematic presentation can be modified interactively such that content that is published can be changed interactively in real time.

It should be appreciated that by selectively retrieving certain files that comport with a specification in the template and blending or merging content files, commonly-related subject matter can be combined into one cohesive presentation in which an idea or an experience can be better-appreciated. By permitting the inclusion of advertising material or other additional content that is related to the thematic presentation, third-party services can provide the indexing and content file assembly services and obtain new and more effective advertising opportunities by including appropriate thematic advertising material into a thematic presentation. A thematic presentation that is composed of photographs, and/or video and/or audio, each of which can be routed to one or more display/playback devices can provide a unique multi-media experience using the custom multi-media service. Service providers who index and/or compile content files into a thematic presentation could include video segments, html pages, pictures or audio files by which their services or goods might be favorably depicted and associated with a pleasant experience memorialized in the content files and presented in a seamless, thematic presentation.

We claim:

1. A method, via at least one computer, of presenting multimedia content for a thematic presentation said method comprised of:
   compiling a set of indexed content files;
   selecting, by a presentation manager implemented by the at least one computer and according to a presentation template stored by the at least one computer, indexed content files of the set of indexed content files, wherein the presentation template comprises specifications for content to be included in the thematic presentation to provide selected indexed content files; and
   selecting, by the presentation manager according to the presentation template, at least one output channel of a plurality of output channels in which to publish the thematic presentation of the selected indexed content files to provide at least one selected output channel; and
   publishing, by the presentation manager, the selected indexed content files, via the at least one selected output channel, into either or both of a first physical environment and a second physical environment that is separated from said first physical environment.

2. The method of claim 1 wherein publishing the thematic presentation further comprises at least one of:
   displaying, by the presentation manager, graphic images on a display device;
   displaying, by the presentation manager, video on at least one video display device;
   broadcasting, by the presentation manager, audio;
   storing, by the presentation manager, a file containing the presentation on a data storage media; and
   transmitting, by the presentation manager, a file containing the presentation via a data network.

3. The method of claim 1, further comprising:
   compiling another set of indexed content files; and
   selecting, by the presentation manager via the at least one computer, indexed content files of the other set of indexed content files according to the presentation template.

4. The method of claim 1, further comprising:
   adding, by the presentation manager to the selected indexed content files, at least one additional content file of advertising material that thematically conforms to said presentation template.

5. The method of claim 1, further comprising:
   selecting and incorporating, by the presentation manager, one or more audio files into the thematic presentation, said audio files to be published as part of the thematic presentation.

6. The method of claim 1 wherein selecting indexed content files further comprises identifying, by the presentation manager, the selected content files as being related to the presentation template according to at least one index that is associated with each of the selected indexed content files.

7. The method of claim 1, further comprising:
adding, by the presentation manager, to the selected indexed content files, at least one html page that thematically conforms to the presentation template.

8. The method of claim 1, further comprising:
adding, by the presentation manager, to the selected indexed content files, graphical content that thematically conforms to the presentation template.

9. The method of claim 1, further comprising:
adding, by the presentation manager, to the selected indexed content files, at least portions of, at least one of previously-broadcast television program or previously-released motion picture that thematically conforms to said presentation template.

10. The method of claim 1 further comprising:
indexing the first and second set of content files to indicate at least one thematic criteria to which each content file of said first and second set of content files relates; and
testing, by the at least one presentation manager, at least some content files of the first and second set of content files for conformance to the respective first and second thematic templates based on the at least one thematic criteria.

11. A method, via at least one computer, of organizing content for a thematic presentation, said method comprising:
ordering, by at least one presentation manager implemented by the at least one computer and according to a first presentation template stored by the at least one computer, at least a portion of a first set of content files into a first thematic presentation, wherein the first thematic template specifies an organization of at least a portion of the first set of content files for a first thematic presentation;
publishing, by the at least one presentation manager, at least part of said first thematic presentation in a first physical environment via at least one first selected output channel of a first plurality of output channels according to the first thematic template;
ordering, by the at least one presentation manager and according to a second thematic template stored by the at least one computer, at least a portion of a second set of content files into a second thematic presentation, wherein the second thematic template specifies an organization of at least a portion of the second set of content files for a second thematic presentation;
publishing, by the at least one presentation manager, at least part of said second thematic presentation in a second physical environment via at least one second selected output channel of a second plurality of output channels according to the second thematic template; and
publishing, by the at least one presentation manager, at least the first thematic presentation in the second physical environment or the second thematic presentation in the first physical environment.

12. The method of claim 11, wherein ordering the at least a portion of the first set of content files into the first thematic presentation further comprises ordering at least a portion of the second set of content files into the first thematic presentation.

13. The method of claim 11, wherein ordering the at least a portion of the second set of content files into the second thematic presentation further comprises ordering at least a portion of the first set of content files into the second thematic presentation.

14. The method of claim 11, further comprising:
adding, by the at least one presentation manager, advertising content to at least one of the first and second thematic presentations.

15. A system for presenting multi-media content for a thematic presentation, the system comprising:
a database of indexed content files;
a presentation template, stored by at least one computer, which identifies content to include into the thematic presentation and at least one output channel in which to publish the thematic presentation;
a presentation manager, implemented by the at least one computer, operatively coupled to the presentation template and to said database of indexed content files, said presentation manager selecting at least some of the indexed content files according to the presentation template to be included in the thematic presentation and selecting at least one output channel of a plurality of output channels in which to publish the thematic presentation to provide at least one selected output channel; and
at least one output device, operatively coupled to the at least one computer, on which said thematic presentation files can be published in accordance with the at least one selected output channel.

16. A system for presenting multi-media content for at least one thematic presentation, the system comprising:
at least one first database of first indexed content files;
at least one second database of second indexed content files;
a first presentation template, stored by at least one computer, which identifies content to include in a first thematic presentation and at least one output channel in which to publish the first thematic presentation;
a first presentation manager, implemented by the at least one computer, operatively coupled to the first presentation template and to said at least one first database and to said at least one second database, said first presentation manager selecting at least some content files from the first or second databases of indexed content files according to the first presentation template to be included in the first thematic presentation, said first presentation manager also selecting at least one first selected output channel of a first plurality of output channels for publishing the first thematic presentation;
a second presentation template, stored by the at least one computer, which identifies content to include in a second thematic presentation and at least one output channel in which to publish the second thematic presentation; and
a second presentation manager, implemented by the at least one computer, operatively coupled to the second presentation template and to said at least one first database of first indexed content files and to said at least one second database of second indexed content files, said second presentation manager selecting at least some content files from the first or second databases of indexed content files according to the second presentation template to be included in the second thematic presentation, said second presentation manager also selecting at least one second selected output channel of a second plurality of output channels for publishing the second thematic presentation.

17. A system for presenting multi-media content for at least one thematic presentation, the system comprising:
at least one database of indexed content files;
a first presentation template, stored by at least one computer, which identifies content to include in a first thematic presentation and at least one output channel in which to publish the first thematic presentation;

a second presentation template, stored by the at least one computer, which identifies content to include in a second thematic presentation and at least one output channel in which to publish the second thematic presentation; and a presentation manager, implemented by the at least one computer, operatively coupled to the first presentation template, the second presentation template and to said at least one database of indexed content files, said presentation manager selecting at least some content files from the at least one database of indexed content files according to the first presentation template or the second presentation template to be included in the first thematic presentation or the second thematic presentation, respectively, said presentation manager also selecting at least one first selected output channel of a first plurality of output channels for publishing the first thematic presentation and selecting at least one second selected output channel of a second plurality of output channels for publishing the second thematic presentation.

* * * * *